Figure 1:
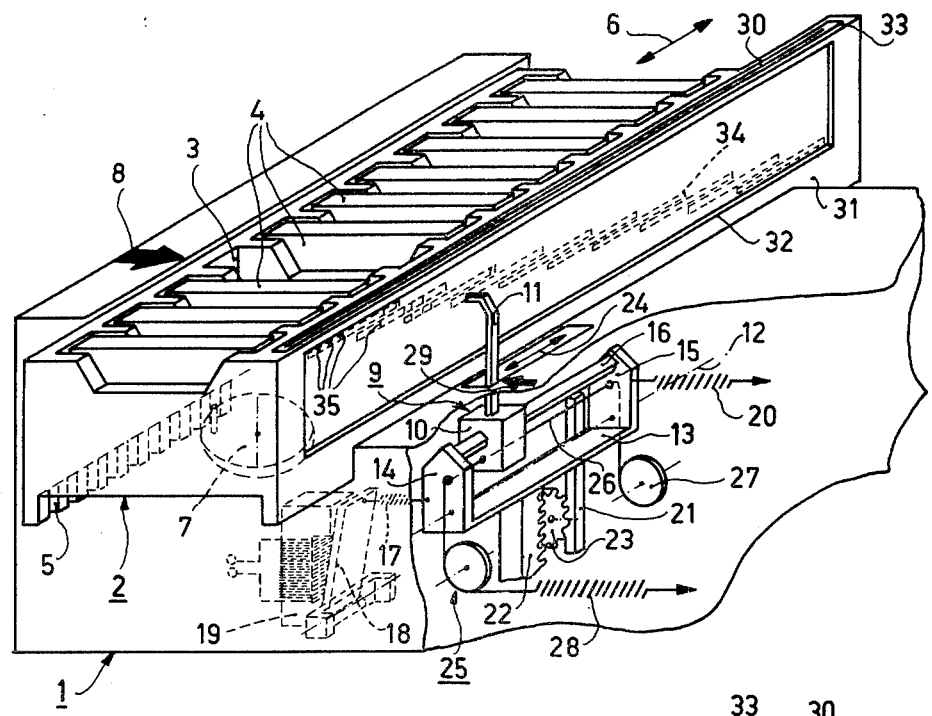

United States Patent [19]
Louzil et al.

[11] 4,075,669
[45] Feb. 21, 1978

[54] INDEX MARKING FOR A CASSETTE MAGAZINE APPARATUS

[75] Inventors: Friedrich Louzil; Gerhard Habelt; Gustav Mrazek, all of Vienna, Austria

[73] Assignee: U.S. Philips Corporation, New York, N.Y.

[21] Appl. No.: 725,782

[22] Filed: Sept. 23, 1976

Related U.S. Application Data

[63] Continuation-in-part of Ser. No. 559,739, March 19, 1975, abandoned.

[30] Foreign Application Priority Data

Mar. 22, 1974 Austria .................................. 2382/74

[51] Int. Cl.² ...................... G11B 15/68; G11B 23/04
[52] U.S. Cl. .......................................... 360/92; 360/72
[58] Field of Search .................... 360/92, 71, 72, 74, 360/132, 78, 105, 96, 93; 179/100.1 PS

[56] References Cited

U.S. PATENT DOCUMENTS

| 3,601,554 | 8/1971 | Rak | 179/100.1 PS |
| 3,677,555 | 7/1972 | Vail et al. | 360/92 |
| 3,682,483 | 8/1972 | White | 360/92 |
| 3,690,679 | 9/1972 | Sterly | 360/72 |
| 3,697,084 | 10/1972 | Ban | 360/92 |
| 3,852,819 | 12/1974 | Staar | 360/92 |
| 3,879,758 | 4/1975 | Pyles | 360/92 |

FOREIGN PATENT DOCUMENTS 2,228,533  2/1973  Germany ............................ 360/92

Primary Examiner—Alfred H. Eddleman
Attorney, Agent, or Firm—Frank R. Trifari; David R. Treacy

[57] ABSTRACT

An indexing device for a recording and/or playback apparatus for tape recording cassettes arranged in a magazine, for selective recording or playback of portions of a selected cassette. The cassette magazine has at least one compartment for insertion of an index strip section, the section being exposed through a window in a peripheral surface of the magazine. The magazine is so arranged that the strip mark device has the same start position for any selected cassette.

6 Claims, 7 Drawing Figures

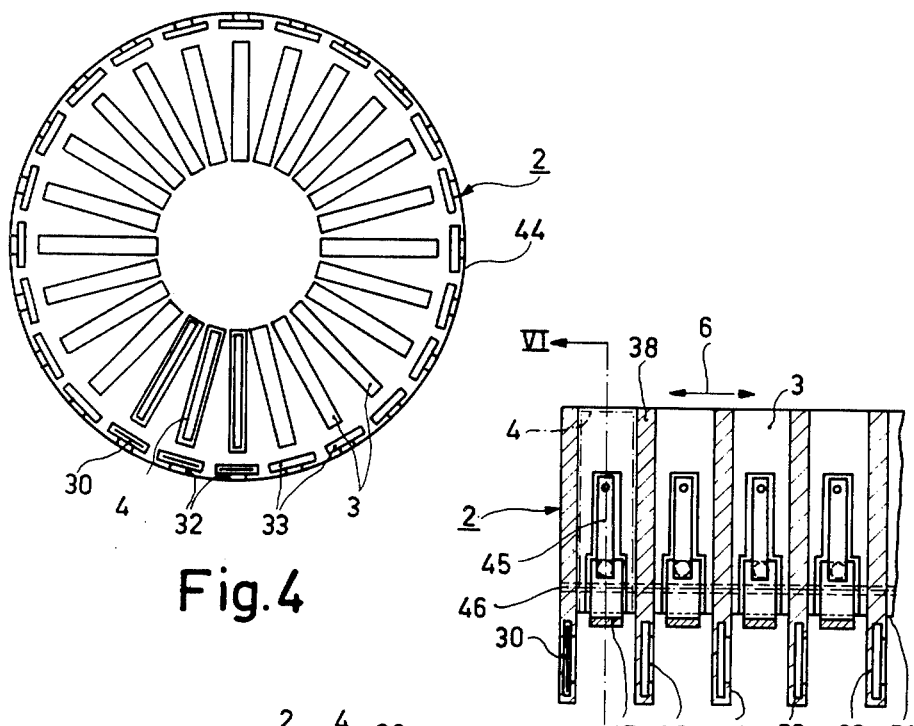
Fig. 4
Fig. 5
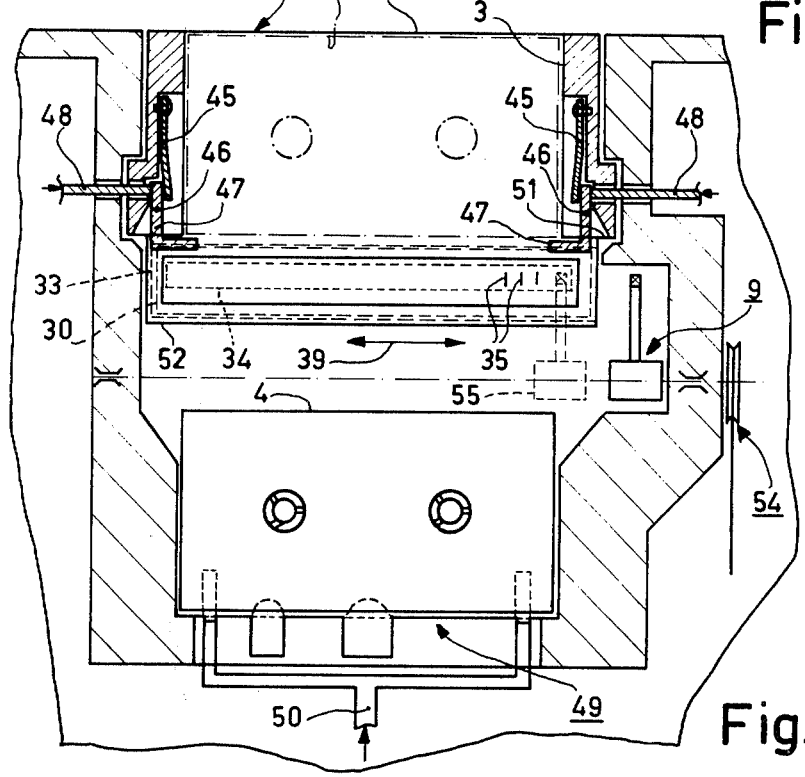
Fig. 6

INDEX MARKING FOR A CASSETTE MAGAZINE APPARATUS

This is a continuation of application Ser. No. 559,739, filed Mar. 19, 1975, now abandoned.

The invention relates to a recording and/or playback apparatus for record carriers in the form of tape which are accommodated in cassettes arranged in adjacent compartments of a magazine which is movable in steps so as to bring each time a selected compartment into a specific position, in which the record carrier of the cassette which is associated with that compartment is movable and can be scanned along at least one track.

Such apparatus is for example described in German Patent Application No. 1,594,075, which has been laid open for public inspection. The invention further relates to an index strip for such a magazine.

It is an object of the invention to provide the possibility during scanning of a track of a record carrier of a cassette of making reproducible marks which correspond to specific passages of said track and, respectively, of reproducing marks already made, for all cassettes accommodated in the magazine. According to the invention this is achieved in that at least one device, hereinafter referred to as a strip mark device, is drivable from the apparatus for making and/or indicating marks on an index strip, which marks identify certain points of a track of a record carrier. On starting the scanning of a track of the record carrier which has previously been brought into an initial position, such a device is set into motion from a predetermined starting position and in synchronism with the movement of the record carrier moves past an index strip section associated with the relevant track, arranged at the periphery of the magazine so as to be accesible for the device. Thus, the sections of at least one index strip are unambiguously allocated to the tracks of the record carriers in the cassettes, so marks can be made and/or indicated on each section by means of the device, which marks identify specific points of the track which corresponding to said section. The above-mentioned specific points of a track of the record carrier may for example be the beginning or the end of a recording, a part of a recording to be corrected etc. It is to be noted that devices for making and/or indicating marks on an index strip are known per se, in which a record carrier is manually inserted in a scanning apparatus. Such an apparatus is for example known from U.S. Pat. No. 2,820,639. However, the present invention relates to an apparatus in which various record carriers comprising at least one track and in a magazine accommodated in cassettes, can be scanned consecutively or arbitrarily; such apparatus frequently being referred to as cassette changers.

The device may for example be incorporated in the apparatus in such a manner, that the direction of movement of the device coincides with the direction of movement of the magazine. However, in view of a simple construction of the apparatus it has been found to be particularly advantageous when the direction of movement of the device is transverse to the direction of movement of the magazine and the device has the same starting position for all cassettes.

A magazine for an apparatus according to the invention as described hereinbefore is characterized in that at least at one of the peripheral surfaces of the magazine at least one compartment having at least one open window is provided, in compartment an index strip comprising at least one section to be inserted. Thus, a simple and unambiguous relationship is obtained between the individual sections of the index strips and the tracks of the record carrier in the cassettes arranged in the magazine, which relationship is also maintained when the magazine is removed from the apparatus.

In an advantageous embodiment of such a magazine according to the invention each chamber has at least one individual compartment for an index strip which is intended for the cassette to be inserted in the revelant chamber. Thus, it is achieved that each cassette has at least one associated index strip, which for further processing, for filing, mailing, etc. can be directly added to the corresponding cassette. A simple and compact further embodiment is characterized in that the compartments are disposed adjacent each other directly at a peripheral surface of the magazine. In a different further embodiment which is particularly advantageous in view of the choice of the dimensions of the compartments and the index strips to be inserted therein, each compartment is disposed at a major surface of a rib and the ribs project from a peripheral surface of the magazine.

In another advantageous embodiment of a magazine according to the invention at least one common compartment for an index strip is provided for a multiplicity of, and preferably all, chambers of the magazine. In this way the number of index strips to be exchanged is minimized.

In connection with the last-mentioned magazine, it is particularly advantageous that the index strip has separate sections, and comprises preferably perforated strips which separate the individual sections and along which the index strip can be divided. Thus, a common index strip for a number of cassettes can simply be divided into sections, after which said sections may be added to the corresponding cassettes for further processing, for filing, mailing etc.

The invention will be described in more detail with reference to some embodiments which are shown in the drawing, but to which the scope of the invention is not limited.

Figure 2:
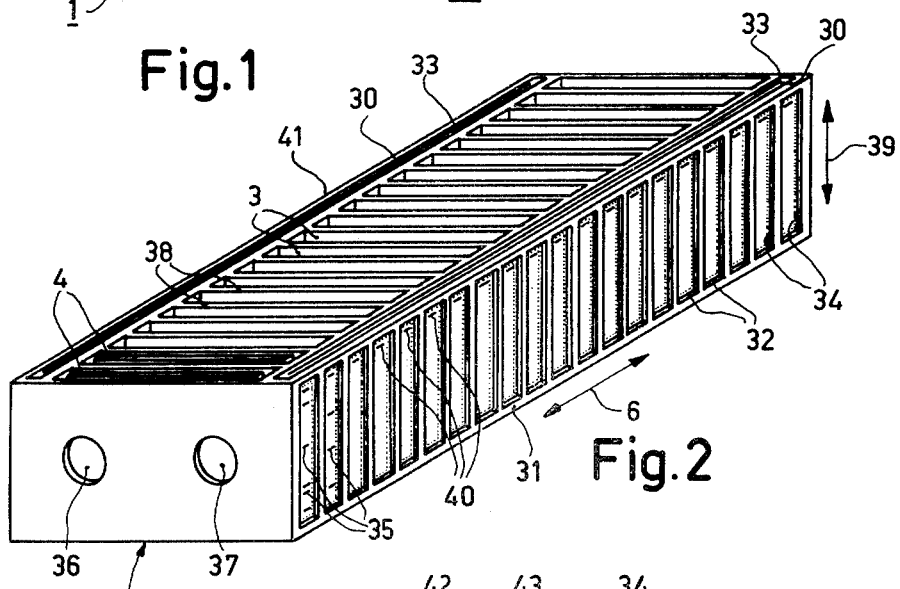
Figure 3:
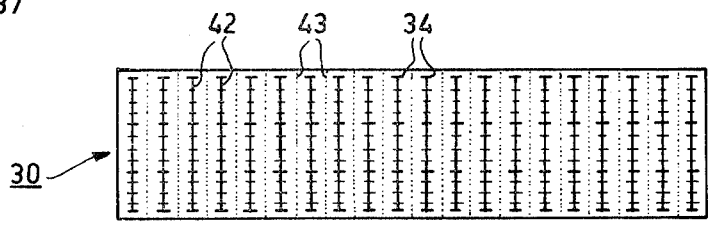
Figure 7:
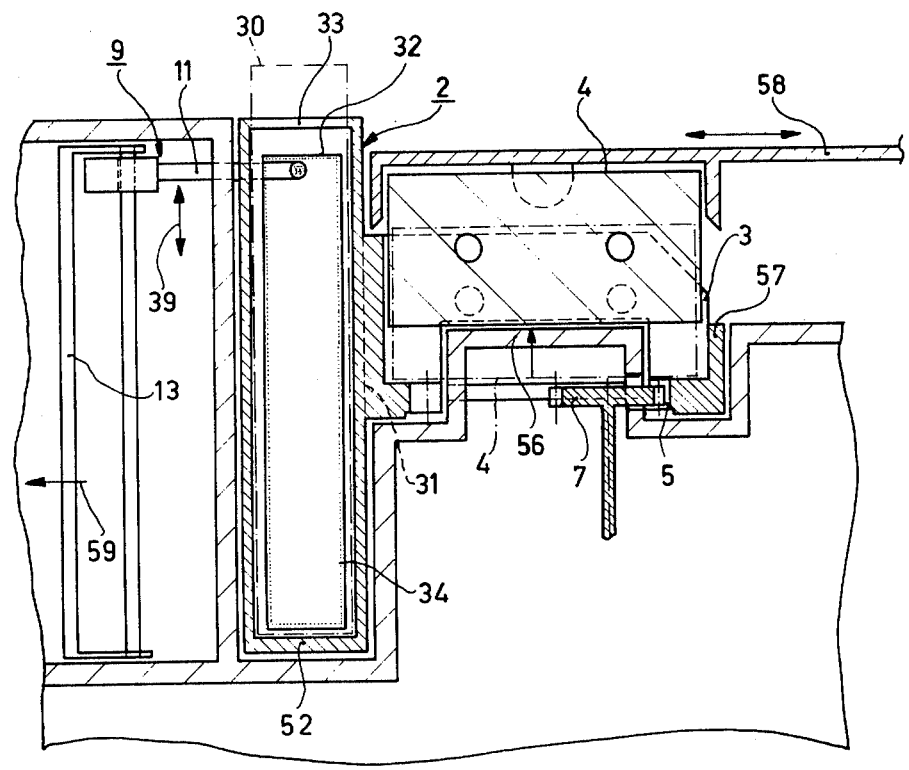

FIG. 1 shows a part of an apparatus in which the strip mark device has a direction of movement which coincides with the direction of movement of the magazine, FIG. 2 shows a magazine which comprises two compartments with several windows for one index strip each, for a strip mark device movement transverse to magazine movement, FIG. 3 shows an index strip for the magazine of FIG. 2, FIG. 4 shows a magazine in the form of a drum, each magazine chamber having an individual compartment for an index strip, FIG. 5 is a longitudinal section of a magazine whose compartments are disposed at ribs which project from the bottom surface of the magazine, FIG. 6 is a section taken at the line VI—VI of the magazine of FIG. 5, said magazine being mounted in an apparatus which is built for such a magazine, and FIG. 7 shows a magazine disposed in an apparatus, which magazine comprises ribs which project from a lateral surface, in which a compartment is provided for an index strip.

FIG. 1 is a perspective view of that part of a recording and/or playback apparatus 1 which is essential for the invention, in which a magazine 2 is disposed. The magazine 2 has a multiplicity of mutually adjacent chambers 3, in each of which a cassette 4 can be inserted which contains a record carrier, not shown, in the form of a tape, which record carrier can be scanned along a single track. Furthermore, the magazine 2 is provided with teeth 5 which engage with a drive member 7 of a drive means, not shown, for the magazine 2, for the stepwise movement of the magazine 2 in the direction of movement which is designated by a double arrow 6. The stepwise movement of the magazine 2 each time allows a chamber 3 to be brought into a position indicated by an arrow 8, in which position the cassette contained in said chamber can be lifted out of the magazine by means of a removal mechanism, not shown, and can be transferred to a scanning section into the apparatus for transporting and scanning the record carrier which is accommodated in the cassette.

The apparatus 1 furthermore comprises a strip mark device 9 for making and/or indicating marks on a section of an index strip, which marks identify certain points on the track of a record carrier. To ensure that the starting situation is the same for all record carriers, the record carrier of a cassette which has been transferred to the scanning station is first of all brought into an individual position, which is also done with the device 9, as will be explained hereinafter. The device 9 comprises a basic body 10 which is movable in the direction of movement of the magazine, and a marking pin 11 attached thereto, which serves for making marks and for indicating the transported length of a record carrier which is in the scanning position. For retaining the device 9 a U-shaped carrier 13 is provided, which is pivotable about a spindle 12 extending in the direction of movement of the magazine, and which is stepwise movable transverse to said direction of movement. Between the two legs 14 and 15 of said carrier a guide rod 16 for the basic body 10 of the device 9 is disposed. The carrier 13 is connected to an armature 18 of an electromagnet 19 by means of a spring 17 and is held against a stop 21 on the apparatus under the influence of another spring 20. For the stepwise movement of the carrier 13, in order to bring the marking pin 11 in specific positions relative to an index strip in accordance with the movement of the magazine, the carrier is provided with a gear rack 22, which co-operates with a driving gear 23.

The basic body 10 of the device 9 is slidable on the guide rod 16 in the direction of movement of the device 9 which is indicated by a double arrow 24. For driving the device 9 a belt drive 25 is provided, whose belt 26 is attached to a pulley 27 at one end and to a return spring 28 at the other end. The pulley 27 can be driven in accordance with the record carrier transport in the scanning section from said section. The return spring 28 serves for returning the device 9 to the position which is indicated by an arrow 29 in FIG. 1, which position corresponds to the starting position of the record carrier in the scanning section. The return spring 28 can return the device 9 to said position, when the drive between the pulley 27 and the scanning section is disengaged, which happens when a cassette is changed.

For accommodating an index strip 30, with which the fingershaped marking pin 11 of the marking device 9 co-operates, a compartment 33 having a window 32, in which the index strip 30 is arranged, is disposed at a peripheral surface 31 which is located at the side. On said index strip 30 sections 34 shown in dotted lines are provided, one of the sections 34 each time belonging to a cassette 4 which is accommodated in a specific chamber 3 of the magazine 2. On said sections 34 marks 35 can be made by means of the device 9. Making and indicating such marks is of special significance for equipment of the type described which are adapted for recording and/or playing back dictations, correspondence and the like. In that case the marks for example indicate the beginning and the end of a dictation or a point where an addition, deletion or amendent or the like is to be made.

By switching on the device for moving the magazine 2, said magazine is moved in the direction of the double arrow 6 in such a way that a specific chamber 3 of the magazine 2 assumes the position indicated by the arrow 8. Subsequently, the cassette contained in said compartment is lifted out of the magazine 2 by a lifting mechanism and is brought to the scanning station. In the embodiment shown the chamber which is in this position is empty, the cassette which belongs to said chamber being already disposed in the scanning station, not shown.

Once a cassette is located in the scanning section, the record carrier contained in said cassette is automatically brought to a starting position which corresponds to the beginning of the record carrier, before it is transported for scanning purposes. Moreover, the device 9 is returned to a specific position indicated by the arrow 29 owing to disengagement of the drive connection between the pulley 27 and the scanning section and by the action of the return spring 28. However, resetting of the device 9 need not necessarily take place upon insertion of a cassette in the scanning section, but may also take place upon removal of a cassette from the scanning section.

Furthermore, the device 9 is moved stepwise transverse to the direction of movement of the magazine 2 by the driving gear 23 with the aid of the gear rack 22, until the marking pin 11 of the device 9 is opposite that section 34 which belongs to the cassette which has been removed from the magazine 2. Said movement of the device 9 is effectively coupled to the movement of the magazine 2, so that automatically the correct position of the device 9 relative to the index strip 30 is obtained in accordance with the chamber of the magazine which is in a pre-determined position.

When subsequently for scanning the track of the record carrier in the scanning section the transport of said carrier is started from the starting position, the device 9 is also put into motion from the starting position, the marking pin 11 then passing over the facing section 34 of the index strip 30 and indicating the length of the record carrier which has been transported in the scanning section in accordance with the covered pathlength. For making marks 35 on that section of the index strip 30 which corresponds to the track of the record carrier of the cassette which is contained in the scanning section, so as to identify specific points of said track, the electro-magnet 19 is energized. As a result of this, the armature 18 is attracted and said armature moves the carrier 13 of the device 9 against the action of the spring 20 under the influence of the spring 17. As a result, the marking pin 11 comes into contact with the index strip 30 and makes a mark 35, for examply by scratching, scribing etc.

Thus, it is now possible to make marks on a specific part of the index strip which are associated with the track of each record carrier in a cassette. Furthermore, it is ensured that the relationship between cassettes and the track of the record carriers accommodated therein respectively and the sections of the index strip is also maintained when the magazine is removed from the apparatus.

The magazine 2 shown in FIG. 2 is adapted to an apparatus where the cassettes 4 inserted in the chambers 3 remain in the magazine 2 during transport of the record carriers accommodated in the cassettes, which magazine can again be moved stepwise in the apparatus in the direction of movement indicated by the double arrow 6. Transport of the record carrier of each cassette 4 is in the present instance effected by means of two drive spindles, which can be made to engage with each cassette through corresponding holes 36 and 37 in all walls of the chambers 3 which face the major surfaces of the cassettes 4. The record carrier of each cassette 4 in this case contains two tracks which can be scanned in mutually opposite directions.

The device provided in such an apparatus for making and/or indicating marks is movable in the direction of movement indicated by a double arrow 39, which in this case is transverse to the direction of movement of the magazine 2. The device then has the same starting position for all cassettes, which corresponds to the starting marks 40 on each section 34 of the index strip 30, as is shown in FIG. 2. Thus, the stepwise movement of the device 9, which in the embodiment of FIG. 2 is necessary when a cassette is changed, may be dispensed with.

In the present embodiment the compartment for an index strip 33, which extends over the peripheral side 31, has a number of windows 32 in accordance with the number of chambers 3, so that a distinctly identifiable relationship between each of the sections 34 denoted by dotted lines and a cassette 4 is obtained. On each of said sections 34 marks 35 can be made or indicated, which marks identify specific points of the track to be scanned in a direction of transport of the record carrier.

For scanning of the tracks to be scanned in the opposite direction of movement of the record carrier, the magazine is taken out of the apparatus and replaced in the apparatus in a horizontally reversed position relative to the drive spindles. In order to allow marks to be made at specific points of the tracks to be scanned now, a second compartment 33 for inserting a second index strip 30 is provided at the lateral peripheral surface 41 which faces the above-mentioned lateral peripheral surface 31. The strip mark device, which is drivable transverse to the direction of movement of the magazine, then again co-operates in a similar manner with said second index strip 30. Thus, marks can be made and/or indicated on each section of two index strips, which identify specific points of the two tracks of a record carrier which is accommodated in a cassette.

However, the magazine of FIG. 2 may also be employed in an apparatus in which each record carrier in a cassette, without removal and reversal of the magazine, can be transported in the opposite direction for scanning a second track. Such an apparatus then has two devices for making and/or indicating marks, of which each time one device cooperates with one of the two index strips 30.

FIG. 3 shows an index strip for a magazine of the above construction. Said index strip 30, of which the individual sections 34 which correspond to a track of a record carrier of a cassette, are each provided with a scale graduation 42, exhibits perforated stripes 43 which separate the individual sections, along which the index strip 30 may be divided into parts 34. Thus, after removal of the index strip from the magazine each section can easily be added to a corresponding cassette, which is advantageous when a cassette together with the appropriate section or sections is to be mailed, filed or must be available for further common processing.

FIG. 4 shows a drum-shaped magazine 2, each chamber 3 for a cassette 4 which can be removed from the magazine, for example by means of a gripping device, having a separate compartment 33 for an index strip 30. The compartments 33 are then disposed adjacent each other at the outer cylindrical peripheral surface 34 of the magazine 2, each compartment 33 being provided with an individual window 32. In such a magazine a cassette and the corresponding index strip are disposed near each other and may be removed from the magazine independently of the other cassettes and index strips.

In the embodiment of FIGS. 5 and 6 the cassettes 4 are retained in the chambers 3 of the magazine 2 by right-angled levers 47, which are loaded by leaf springs 45 and which are pivotable about two spindles 46 which extend adjacent to the cassettes. The cassettes can be removed from the magazine 2 towards a scanning section 49 by the action of gravity after the levers are moved by disengagement pins 48 of the apparatus. For returning a cassette 4 from the scanning section 49 to the magazine 2 a lifting device 50 has been provided.

At the prolongation of the walls 38 said magazine near each chamber 3 has ribs 52 which project from the peripheral surface 51 at the bottom of the magazine 2, at the one major surface 53 of which ribs a compartment 33 for an index strip 30 is provided. The strip comprises a section 34 for marks 35, which section corresponds to a track of a record carrier accommodated in a cassette and is accessible through a window of the compartment 33.

The apparatus again includes a device 9 whose direction of movement which is indicated by the double arrow 39, in analogy with the embodiment of FIG. 2, is transverse to the direction of movement of the magazine 2 which is indicated by means of the double arrow 6. In this respect it is to be noted that before the device 9 is driven by means of a symbolically represented drive means 54 in accordance with the transport of a record carrier which has been previously brought into the starting position, said device is set to an initial position 55 which is the same for all cassettes 4 and is indicated by dashed lines.

A magazine as described hereinbefore may also comprise a compartment for an index strip at both major surfaces of each rib 52 which projects from the peripheral surface near the bottom, one index strip being allocated to one of two tracks on the record carrier of the cassette to be inserted in the relevant chamber. When in view of the marks to be made an index strip is used which in inself is rigid, the two compartments may be combined to one compartment with two opposite windows through elimination of the partition wall.

In the embodiment of FIG. 7 the cassettes 4 to be inserted in the magazine 2 are raised beyond the level of the shortened side wall 57 of the magazine 2 by means of a roof-shaped ramp 56 which is fixed to the apparatus, so that each time the cassette 4 which is disposed at the highest point of the ramp 56 can be removed from the magazine 2 or re-inserted into the magazine by means of a slide 58. The device, which again can be moved transverse to the direction of movement of the magazine 2 in the direction of the double arrow 39 and which has the same starting position for all cassettes, is in the present instance disposed on a carrier 13 which is movable in the direction of the arrow 59, to withdraw the marking pin 11 of the device 9 out of the path of the magazine 2 when this is advanced.

Each chamber of the magazine 2 is associated with a compartment 33, which is disposed at a major surface rib 52 which projects from a lateral peripheral surface 31 of the magazine 2, each compartment 33 having a window 32 for access of the marking pin 11 of the device 9 to a section 54 of the index strip 30, which section corresponds to the relevant cassette, the strip being indicated by dotted lines. In that case the dimensions of the compartments for the index strip and thus those of the index strips themselves are independent of the other dimensions of the magazine. Consequently, the dimensions can be readily adapted to the required and advantageous constructional situation.

A magazine of the type described above may also comprise ribs at the two opposed lateral peripheral surfaces which project from said surfaces, at which ribs the compartments serving for receiving the index strips are arranged.

It will be obvious that for those skilled in the art several modifications of the previously described embodiments are conceivable without departing from the scope of the invention. This applies in particular with respect to the design, the drive and the actuation of the device for making and/or indicating marks and the design and the arrangement of the compartments for the index strips. For example, such a device may comprise two marking pins which can be actuated independently from each other, which make and/or indicate two groups of marks on an index strip, or as in the above embodiment only one marking pin which can be set to two marking positions to obtain two groups of marks. Such a device may for example also be driven by means of a worm drive and the actuation may be effected manually instead of electro-magnetically. Furthermore, it is evident that the compartments may also be curved and that if the compartments are disposed at the major surfaces of ribs, said ribs may extend from a peripheral surface of the magazine at an angle deviating from a 90° angle.

What is claimed is:

1. An improved recording and/or playback apparatus for record carriers accommodated in tape cassettes, comprising a magazine having a plurality of chambers for accommodating cassettes containing record carrier tapes, means for positioning said magazine to align a selected chamber for scanning, and means for scanning a track on the tape of the cassette associated with the selected chamber, wherein the improvement comprises:
   an index strip having a respective plurality of index strip sections, one section associated with each cassette,
   means for holding said strip on the magazine, each section being aligned at a location on the magazine associated with the respective cassette,
   a strip mark device for marking or sensing marks at a point along a section,
   mounting means for holding the said strip mark device at a starting position associated with the location of the section associated with a selected cassette, and
   means, responsive to operation of said scanning means, for moving said strip mark device past said associated strip section in synchronism with scanning of a track on the carrier of the selected cassette.

2. An apparatus as claimed in claim 1, wherein said scanning means scans in a selected one of two directions of tape travel, comprising two strips each strip being associated with a respective one of said two directions of tape travel, the sections associated with a same direction of tape travel being regions of a single strip only, and the starting position being the same for all cassettes, said magazine being so arranged that the strip section associated with a selected cassette and direction of tape travel is aligned with said starting position.

3. An appartus as claimed in claim 2, wherein a direction of movement of the strip mark device is transverse to a direction of movement of the magazine for selecting cassettes, said starting position being different for each cassette.

4. An apparatus as claimed in claim 1, wherein said magazine has a peripheral surface having a compartment for receiving a single index strip, said compartment being arranged such that said strip is removable, said compartment having at least one window providing access for said strip mark device.

5. An improved recording and/or playback apparatus for record carriers accommodated in tape cassettes, comprising a magazine having a plurality of chambers for accommodating cassettes containing record carrier tapes, means for positioning said magazine to align a selected chamber for scanning, and means for scanning a track on the tape of the cassette associated with the selected chamber, wherein the improvement comprises:
   a respective plurality of index strip sections, one section associated with each cassette chamber,
   means for removably receiving and holding said strip sections in the magazine, each section being aligned at a location on the magazine associated with the respective cassette, said receiving and holding means comprising a respective plurality of compartments, one individual compartment in said magazine being associated with each chamber, said compartments being disposed adjacent each other directly at a peripheral surface of the magazine,
   a strip mark device for making or indicating marks at a point along a section,
   mounting means for holding said strip mark device at a starting position, said magazine being so arranged that the strip section associated with a selected cassette chamber is aligned with said starting position, and
   means responsive to operation of said scanning means for moving said strip mark device past said associated strip section in synchronism with scanning of a track on the carrier of the selected cassette.

6. An apparatus as claimed in claim 5, wherein said magazine comprises a plurality of ribs projecting from a peripheral surface, associated with respective chambers, and said compartments comprise at least one individual compartment in each rib for receiving an index strip section associated with that chamber, said compartment having at least one window providing access for said strip mark device.

* * * * *

UNITED STATES PATENT AND TRADEMARK OFFICE
CERTIFICATE OF CORRECTION

PATENT NO. : 4,075,669
DATED : February 21, 1978
INVENTOR(S) : FRIEDRICH LOUZIL ET AL It is certified that error appears in the above—identified patent and that said Letters Patent is hereby corrected as shown below:

In the Title Page: Item number [63]

(Continuation-in-part" should be --Continuation--

Col. 1, lines 50-51, after "track and" delete "in a magazine";

after "accommodated in cassettes" insert

--in a magazine--; and delete ","

line 64, after "in that" insert --in-- line 67, after "is provided, in" insert --which--

Col. 3, line 22, "individual" should be --initial--

Col. 6, line 53, "inself" should be --itself--

Signed and Sealed this

Seventh Day of September 1982

[SEAL]

Attest:

GERALD J. MOSSINGHOFF

Attesting Officer     Commissioner of Patents and Trademarks